April 30, 1957     G. T. ROSHOLT     2,790,680
COMBINATION HOSE NOZZLE, VALVE AND SWIVEL COUPLER
Filed Jan. 27, 1955
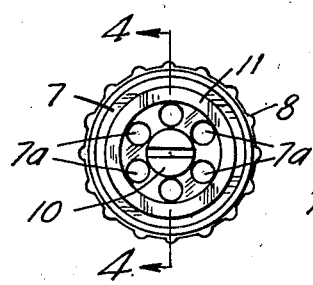
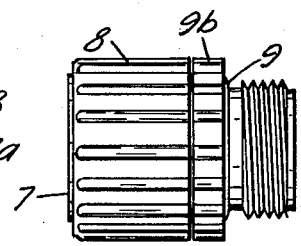
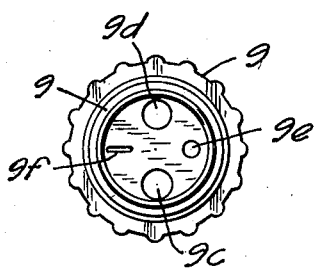
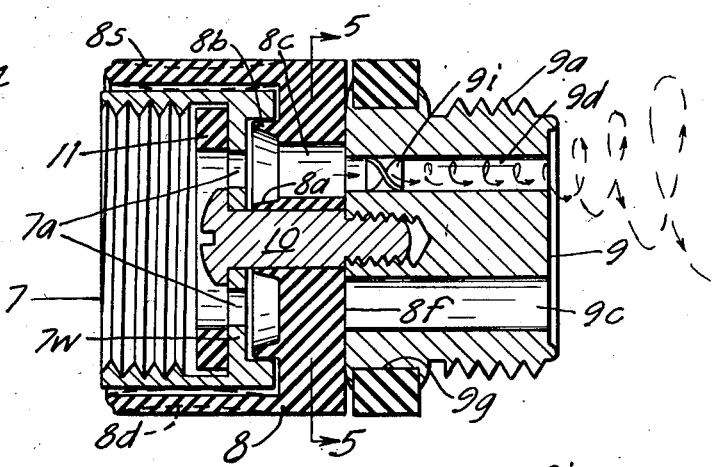
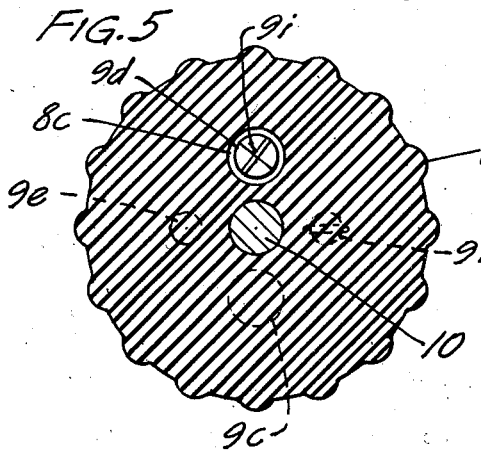
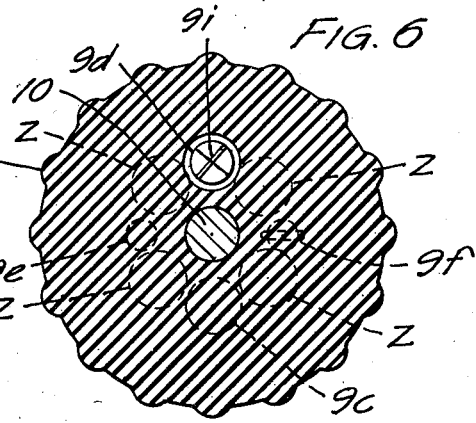
INVENTOR
GORDON T. ROSHOLT
BY
Williamson, Williamson, Schroeder & Adams
ATTORNEYS : 2,790,680
Patented Apr. 30, 1957

2,790,680

COMBINATION HOSE NOZZLE, VALVE, AND SWIVEL COUPLER

Gordon T. Rosholt, Minneapolis, Minn.

Application January 27, 1955, Serial No. 484,431

5 Claims. (Cl. 299—105)

This invention relates to improvements in hose nozzles to the end that in a unitary item, a combination nozzle, adjustable valve and coupler for general utility is provided.

The most common prior art hose nozzle is generally constructed of two basic parts comprising a threaded body portion which attaches to the supply hose and terminates in a contoured nozzle tip and at tubular and usually tapered orifice body which fits snugly over the nozzle tongue and which may be spirally moved thereon to displace the relative positioning of tongue and orifice, thereby regulating the water stream. Some prior art, including the patents to Martin et al., No. 240,833 and Lally, No. 1,812,794 disclose the provision in a nozzle of means at the outer portion for attachment of other appliances. The structure of said patents, however, seemed cumbersome and impractical because no means for adjustment and shut-off were provided and furthermore, the tip could not be rotated without disturbing the attachment to the supply hose. In fact, if an attempt is made with said structures to add a coupled device, the whole nozzle would be so large and heavy as to add a cumbersome weight to an appliance such as a car-washing brush, sprinkler or the like. Furthermore, these structures provided no means for shut-off.

It is an object of my present invention to provide important improvements in the construction and design of hose nozzles which will offer a combination nozzle, valve and swivel coupler for general utility while eliminating the aforesaid difficulties of prior art devices.

Another object is the provision of a device of the class described, wherein the nozzle is left permanently attached to the hose with shut-off valve and means for throttling, stopping or variably controlling the flow of water to a secondary hose or an appliance such as a sprinkler or brush, and providing a swivel connection to permit full flexibility in the use of the attached appliance without interference with the adjustment of the valve.

A further object is the accomplishment of the aforesaid functional advantages with a device which is very light in weight, thereby not impeding use of attached appliances, and which is further of a structure and design permissive of very economical production to the end that it can compete marketwise with ordinary nozzles which lack the afore-recited features.

The foregoing and other advantages of my invention will more fully appear from the following description made in connection with the accompanying drawings, wherein like reference characters refer to the same or similar parts throughout the several views, and in which:

Fig. 1 is a rear end elevation of an embodiment of the invention detached from a hose;

Fig. 2 is a side elevation of the same;

Fig. 3 is a forward end elevation;

Fig. 4 is a vertical section taken along the line 4—4 of Fig. 1; and

Figs. 5 and 6 are cross-sections both taken on the line 5—5 of Fig. 4 and looking respectively in the direction as indicated by the applied arrows. Fig. 6 in heavy dotted lines indicating alternative selective positions of discharge openings, all of which shut off flow of water through the nozzle.

With further reference to the drawings, particularly Fig. 4, it will be noted that my combination nozzle, valve and swivel coupler comprises three principal parts, to wit: the hose nut 7, the valve disc 8 and the nozzle tip 9, said parts being axially related and held together by a retaining screw 10. A packing washer 11 mounted concentrically within the hose nut 7 completes the assembly of parts.

The hose nut 7 is essentially a short hollow cylinder having at the rear end an internal screw thread for connection with an external fitting at the outer end of a conventional garden hose. Hose nut 7 has a smooth, cylindrical and narrow internal surface at the opposite end, and between its ends is provided with a rigid disc web $7w$ which partially obstructs passage through the cylinder of the member. A smooth circular aperture is formed at the axial portion of this web for accommodating the shank of the screw 10. Additional openings or ports $7a$ are formed in the disc web $7w$, being circumferentially spaced as clearly shown in Fig. 1, for permitting flow of fluids through the web as indicated by the arrows in Fig. 4. The packing washer 11 in cooperation with the outer extremity of the metal hose fitting (not shown) is compressed against the disc $7w$ to prevent liquid from leaking back through the threads.

The valve disc 8 is preferably constructed from a resilient, somewhat compressible material approximating a durometer measurement of 80, such as live rubber, and carries at its outer end a planar surface $8f$ which is adapted to engage with sealing effect the rear end of the metal nozzle tip or sleeve 9. Valve disc 8 has preferably integrally formed therewith, a rearwardly extending sleeve $8s$ which rather loosely surrounds the periphery of the hose nut 7 and is deformable as indicated by the dotted lines $8d$ when pressed inwardly to afford a firm grip for holding the combination nozzle device. The rear surface of the disc proper is provided with concentric annular flanges $8a$ and $8b$, the central flange $8a$ constituting a narrow sleeve which fits closely around the shank of the screw 10. The intermediately disposed annular flange $8b$ closely fits internally against the smooth internal, annular shoulder at the forward end of hose nut 7. Valve disc 8 is provided with a cylindrical, central aperture which snugly accommodates screw 10 and with preferably just one concentric cylindrical port $8c$ serving as the sole passage for liquid through the disc.

The nozzle tip 9 is generally cylindrical with the outer portion of its periphery $9a$ threaded to facilitate attachment of hose appliances such as sprinklers, water brushes or the like. At the rear portion of the periphery, a shallow, annular retaining groove $9g$ is provided in which a ribbed resilient gripping annulus (preferably constructed of rubber) is seated and retained. The nozzle tip 9 is formed originally as a solid member, thereafter apertured and slit as shown in Fig. 3 to provide a plurality of circumferentially disposed, different water passages for producing variable streams. The axial portion of the rear end is tapped for short distance to threadedly accommodate the forward end of the retaining screw 10, as shown in Fig. 4.

As clearly shown in Figs. 3 and 4, four water passages or ducts $9c$, $9d$, $9e$, and $9f$, circumferentially arranged on radii similar to the center radius of the enlarged water port $8c$ of valve disc 8, are provided extending longitudinally through the entire length of the member 9. The several off-center, circumferentially spaced water passages in nozzle tip 9 are of different sizes and have varying contours produce various flow characteristics in the stream of liquid discharged. Thus the duct 9c is a cylindrical passage of relatively large diameter permitting maximum volume delivery. Duct 9e is of relatively small bore producing a finer, higher velocity stream. Duct 9d, as shown of approximate equal diameter to duct 9c, is provided with a small spiral core or water impeller 9i which imparts a spiral motion to the liquid causing the same to spread out in a conical spray when discharged. Duct 9f is cylindrical in the rear end thereof through most of its length but is narrowed to a slot at its outlet to produce a fan shaped stream. It will of course be understood that other duct contours could be substituted for or added to those previously described.

The arrangement of the several water ducts of nozzle tip 9 and their relationship to the enlarged, off-center water passage 8c in the valve disc 8 are show in Figs. 5 and 6 which as previously stated, constitute two cross sectional views at the plane indicated by line 5—5 of Fig. 4. The single water port 8c through the valve disc 8 is disposed radially (to center) from the axis of the nozzle structure the same distance as are the several discharge ducts or passages 9c, 9d, 9e, and 9f in the nozzle tip 9. The circumferential spacing of the said discharge ports in the nozzel tip is such as will be evident from Fig. 6 wherein the various positions of such ports intermediate of a connected position are indicated in dotted line Z, so that by slight turning of the nozzle 9 from any water connected position, the single passage 8c through the valve disc is closed by the intermediate solid portions of the inner end of the nozzle tip between the water discharge ports.

In this connection (see Fig. 4) liquid having entered the space between the central annular flange 8a and the intermediate, annular flange 8b at the rear of the disc 8, exerts hydraulic pressure inwardly against the central flange and outwardly against the intermediate flange, thereby forcing both against their mating, cylindrical surfaces and producing effective sealing. The joint between the hose nut and the valve disc is sealed through pressure against the beveled flange 8b and the internal annular shoulder of the inner end 7w of the hose nut. The joint between the valve disc and retaining pivot bolt 10 is sealed by pressure of the fluid against the central, smaller, annular flange 8a. The same hydraulic pressure acting axially against valve disc 8 presses it tightly against the rear end of the nozzle tip, thereby sealing these parts and preventing leakage therebetween.

It will further be noted that the peripheral sleeve 8s at the rear of valve disc 8 although detached from the hose nut furnishes an efficient grip by which the nut can be threaded upon or removed from the terminal of the supply hose.

In Fig. 6 in heavy dotted lines, the selective, intermediate positioning of the water passage 8c of the valve disc relative to the several selective nozzle passages 9c, 9d, 9e and 9f is indicated by the letter Z. It will be seen that the nozzle passages are circumferentially spaced apart a sufficient distance to leave a web or stock therebetween of adequate area to completely cover and close water passage 8c of the valve disc. It will further be seen that in producing relative rotation between nozzle member 9 and valve disc 8 from one discharge port to the other, there is always an intermediate positioning of the parts which positively closes water passage 8c.

Due to the foregoing construction and close cooperation of parts, the discharge stream can be very quickly and easily adjusted by turning the nozzle member 9, relative to the valve disc 8. The ribbed grip 9b facilitates this operation. In the embodiment shown, one relative revolution of said two parts is effective to produce four different streams from the nozzle, and, intermediate such stream connections, to produce four shut-offs of the stream of water.

It will further be seen that with my improved structure a device such as a water brush or sprinkler may be readily and easily coupled with the external thread 9a of the nozzle member without interfering with or requiring relative rotation of the valve disc part, as the valve disc 8 is free to turn relative to the hose nut 7. Likewise, because all three of the essential parts 7, 8 and 9 are independently swiveled, ease of attachment of the hose connection part with the hose, is assured.

It is further pointed out that in use when an auxiliary device such as a sprinkler or fluid brush is attached to the nozzle port 9, if occasion to rotationally adjust the auxiliary device is present, the alignment of the water passage 8c in the disc 8 with one of the selective discharge passages in the nozzle member will not be disturbed but the nozzle member 9 and valve disc 8 will turn together since the axial water pressure applies pressure over a large annular area between the outer end of disc 8 and nozzle member 9 than between the relatively restricted, annular sealing area between the annular, resilient flange 8b and the internal mating shoulder at the inner end of hose connection member 7.

From the foregoing description, it will be seen that I have provided a highly efficient combination nozzle valve and swivel coupler for hoses which is capable of manufacture at low cost, which gives a variety of adjustments in sprays discharged from a hose and which readily enables the passage of water to be shut off at various intermediate points of adjustment and in addition, provides a swivel coupling to readily connect an auxiliary device such as a fluid brush, sprinkler or the like.

Attention is directed to the manifold functions provided by my integral valve disc member 8 and its cooperative relation with other parts of the device. First, valve disc 8 provides a main fluid passage for selective interconnection with the several discharge passages 9c, 9d, 9e and 9f of the nozzle member and in its inherent construction in combination with the spaced relation of said discharge passages, furnishes efficient means of shutting off flow of fluid through the device at points between selective registration of the several discharge ports. Next, member 8 in its relation with the outer end of the hose connection member 7 and the annular shoulder provided at said end, provides pressure actuated sealing connections through the larger annular sealing flange 8b. Member 8 also through the provision of the central annular sealing flange 8a provides pressure actuated efficient sealing means against the periphery of the interconnecting pivot bolt 10. In addition, the valve disc 8 at its outer end provides a highly efficient pressure actuated, sealed joint between itself and the selectively oscillatable nozzle member 9. A still further function of the member 8 is the provision of the elongated skirt 8s loosely surrounding the periphery of the hose connection and readily deformable through inward pressure to facilitate gripping and interconnection of the members 7 and 8 when coupling attachment of the hose connection is desired with the hose. The said skirt also because of its rubber or compressible, resilient construction provides a guard or protection to prevent abrasion or marring of articles or other devices in the path of movement or travel of the hose.

It will of course be understood that various changes may be made in the form, details, arrangements and proportions of the parts without departing from the scope of my invention.

What is claimed is:

1. A combination nozzle, valve and coupler for a hose comprising as essential elements, three members, all arranged coaxially in end to end relation, a common axial pivot means interconnecting said three members to restrain the same against longitudinal displacement while permitting relative oscillation of all of said members, the inner member of said three having hose connection means and also having an outer end pivotally engaging said intermediate member and provided with fluid passage means therein and with a relatively large, concentric, annular sealing shoulder, the intermediate member being constructed of somewhat compressible, resilient material and having a fluid passage offset from the axis thereof and further, having an annular contact, sealing surface at the outer end thereof engaging an annular surface at the inner end of said outer member, said intermediate member also having protruding from its inner surface, a relatively large, annular sealing flange for engagement with the annular flange of said first mentioned member and also a smaller, protruding annular sealing flange surrounding the periphery of the medial portion of said axial pivot means, fluid pressure through said inner member pressing said two annular sealing flanges of said intermediate member against their respective mating portions of said inner member and said bolt respectively, said outer member having a plurality of differently shaped fluid passages spaced circumferentially in approximately the same offset relation to the axis of said outer member as that of the fluid passage in said intermediate member and said last mentioned fluid passages being spaced apart adequate distance to provide a series of valve closure area portions to shut off flow of fluid through the device at a plurality of said intermediate positions.

2. A combination nozzle, valve and coupler for a hose comprising as essential elements, three members, all arranged coaxially in end to end relation, means for interconnecting said members to restrain the same against longitudinal displacement while permitting relative rotation between all of said members, the inner member of said three having means for connection with the hose and having an outer end pivotally engaging said intermediate member and provided with fluid passage means therethrough, the intermediate member being constructed of somewhat compressible, resilient material and having a fluid passage offset from the axis thereof and further having a pivotal annular contact sealing surface at the outer end thereof engaging an annular surface at the inner end of said outer member, said outer member having a plurality of differently shaped fluid passages arranged circumferentially in approximately the same offset relation to its axis as that of the fluid passage in said intermediate member, said interconnecting means being disposed axially of said three members whereby water pressure axially presses the outer end of said intermediate member and the inner end of said outer member together to form an efficient liquid seal therebetween, wherein said interconnecting means constitutes a single pivot bolt having a head engaging the end of one of said members and having at its outer end, an anchored connection with another of said members and having a portion passing through said intermediate member.

3. A combination nozzle, valve and coupler for a hose comprising as essential elements, three members, all arranged coaxially in end to end relation, means for interconnecting said members to restrain the same against longitudinal displacement while permitting relative rotation between all of said members, the inner member of said three having means for connection with the hose and having an outer end pivotally engaging said intermediate member and provided with fluid passage means therethrough, the intermediate member being constructed of somewhat compressible, resilient material and having a fluid passage offset from the axis thereof and further having a pivotal annular contact sealing surface at the outer end thereof engaging an annular surface at the inner end of said outer member, said outer member having a plurality of differently shaped fluid passages arranged circumferentially in approximately the same offset relation to its axis as that of the fluid passage in said intermediate member, said interconnecting means being disposed axially of said three members whereby water pressure axially presses the outer end of said intermediate member and the inner end of said outer member together to form an efficient liquid seal therebetween, wherein the outer end of said inner member is provided with an internal annular shoulder and wherein said intermediate resilient member is provided with an annular flange for engagement with said first mentioned shoulder, axial water pressure pressing said flange against said shoulder to form an efficient seal.

4. The structure set forth in claim 2 further characterized by a central, annular sealing flange protruding inwardly from said central member and surrounding and engaging the periphery of said pivot bolt whereby fluid pressure will press said flange into sealed relation against the periphery of said bolt.

5. The structure set forth in claim 2 wherein said intermediate member constitutes in the body portion thereof, a resilient valve disc and has connected therewith an inwardly extending skirt loosely surrounding the periphery of said inner member and deformable radially inwardly by gripping pressure.

References Cited in the file of this patent

UNITED STATES PATENTS

| | | |
|---|---|---|
| 240,833 | Martin et al. | May 3, 1881 |
| 937,368 | Gladding | Oct. 19, 1909 |
| 1,812,794 | Lally | June 30, 1931 |
| 2,132,333 | Wendell et al. | Oct. 4, 1938 |